United States Patent [19]
Seiler et al.

[11] 3,882,901
[45] May 13, 1975

[54] TUBULAR QUARTZ GLASS BODY

[75] Inventors: Karl Seiler; Karlheinz Rau, both of Hanau am Main, Germany

[73] Assignee: Heraeus-Schott Quarzschmelze GmbH, Hanau am Main, Germany

[22] Filed: July 30, 1973

[21] Appl. No.: 384,329

[30] Foreign Application Priority Data
Aug. 5, 1972 Germany.................... 7229058[U]

[52] U.S. Cl. ........... 138/141; 138/109; 138/DIG. 2; 161/1; 161/164; 161/165; 161/193; 252/62.3 R
[51] Int. Cl. ......... F16l 9/14; F16l 9/10; B32b 17/06
[58] Field of Search ..... 252/62.3 E, 62.3 C, 62.3 R; 65/18, DIG. 8; 161/45, 139, 164, 165, 193

[56] References Cited
UNITED STATES PATENTS

| | | | |
|---|---|---|---|
| 3,128,169 | 4/1964 | Heraens et al. | 65/18 X |
| 3,335,035 | 8/1967 | Marshall et al. | 252/62.3 E X |
| 3,382,113 | 5/1968 | Ebert et al. | 252/62.3 C X |
| 3,386,866 | 6/1968 | Ebert et al. | 252/62.3 C X |
| 3,486,870 | 12/1969 | Vervaart et al. | 65/18 X |
| 3,772,134 | 11/1973 | Rau | 106/47 R X |
| 3,776,809 | 12/1973 | Baumler et al. | 161/164 |

Primary Examiner—George F. Lesmes
Assistant Examiner—Alan T. McDonald
Attorney, Agent, or Firm—Burgess, Dinklage & Sprung

[57] ABSTRACT

A tubular quartz glass body useful in carrying out diffusion processes in semiconductor technology has an inner tubular portion of high-purity synthetic quartz glass which is fused to a surrounding portion of fused quartz crystal granules or powder. Then surrounding, enveloping portion has an outer layer of finely crystalline cristobalite or in the outer surface layer thereof, crystallization promoting nuclei capable of forming an outer layer of crystalline silica. The nuclei are not semiconductor poisons and have a rate of diffusion in quartz glass less than that of sodium at elevated temperatures, such as temperatures encountered in diffusion processes which are between 1,200° and 1,380°C.

3 Claims, 3 Drawing Figures

3,882,901

PATENTED MAY 13 1975

TUBULAR QUARTZ GLASS BODY

BACKGROUND

The invention relates to a tubular quartz glass body dimentionally stable shape at high temperatures for solid-state technology, especially for the performance of the diffusion process in semiconductor technology.

Diffusion processes are preferred for the doping of solids such as silicon or germanium wafers with boron, gallium, indium, phosphorus, arsenic, and antimony, and for oxidation. These diffusion processes are performed under very pure conditions at high temperatures, for example temperatures greater than 1,000°C. Therefore, high-purity quartz glass is used in many cases as a material for the diffusion devices such as diffusion tubes or ampoules.

U.S. Pat. Application Ser. No. 166,844, filed July 28, 1971, now U.S. Pat. No. 3,776,809 issued Dec. 4, 1973 discloses tubular quartz glass bodies which are used in semiconductor component manufacturing processes performed at high temperatures. In their outer surface layer they contain, in addition to $SiO_2$, crystallization promoting nuclei which are not semiconductor poisons and/or whose rate of diffusion in $SiO_2$ at temperatures ranging between 1,200° and 1,380°C is low in comparison to that of sodium.

Said application Ser. No. 166,844 furthermore discloses coated quartz glass tubes for use at temperatures above 1,000°C, which are used for the performance of processes relating to semiconductor technology. They are characterized by a coating of a coherent, finely crystalline cristobalite whose thickness is less than 1% of the wall thickness of the quartz glass tube in the area of the coating.

These known tubular glass bodies have the advantage that, under long exposure to temperatures reaching as high as about 1,300°C, they undergo no deformation or plastic distortion. These quartz glass bodies are thus shape-stable at high temperatures. A very pure quartz glass is used as the material from which they are made, in view of the high purity requirements of semiconductor manufacture, and consequently the quartz glass bodies of the prior art are, of course, expensive.

Setting out from this state of the art, the invention addressed itself to the problem of creating a tubular quartz glass body having stability of shape at high temperatures for use in solid-state technology, which on the one hand will satisfy the high purity requirements, but on the other hand will cost less than the quartz glass bodies of the prior art.

SUMMARY

This problem is solved by the invention in that the quartz glass body consists of an inner tubular portion of highly pure synthetic quartz glass to which there is fused an enveloping or surrounding portion of fused quartz crystal grains or fused quartz crystal powder which contains the nuclei or the cristobalite layer.

Thus, tubular quartz glass bodies of the invention, useful for carrying out diffusion processes in semiconductor technology, comprise an inner tubular portion of high-purity synthetic quartz glass which is fused to a surrounding or enveloping portion of fused quartz crystal granules or fused quartz crystal powder having an outer layer of finely crystalline cristobalite, or in the outer surface layer thereof, crystallization promoting nuclei capable of forming an outer layer of crystalline silica, said nuclei having a rate of diffusion in quartz glass less than that of sodium at elevated temperatures, e.g. 1,200° to 1,380°C.

In further development of the invention, the tubular quartz glass body may be formed into a diffusion ampoule by hermetically sealing the one end of the tube with a quartz glass lid provided with tubular studs and hermetically sealing the other end of the tube with a bottom of quartz glass which, if desired, may have a tubular stud.

DESCRIPTION OF THE DRAWING

The present invention will be more fully understood from the following description taken in conjunction with the accompanying drawing wherein.

DESCRIPTION

The term "tubular quartz glass bodies" is, of course, to cover common ampoule forms known in semiconductor technology, such as those which are known, for example, from British Pat. No. 1,244,069 and French Pat. No. 2,078,934.

The tubular quartz glass bodies of high-temperature shape stability in accordance with the invention have the advantage that only their inner surfaces consist of high-purity synthetic quartz glass, thereby complying with the high purity requirements of semiconductor technology. The outer portion of the tubular quartz glass body consists of a quartz glass which is not as expensive to manufacture as the synthetic material. Furthermore, the tubular quartz glass bodies of the invention have the additional advantage of a still greater stability at high diffusion temperatures than shape-stabilized tubular quartz glass bodies of synthetic quartz glass, because the quartz glass made of fused quartz crystal powder or from fused quartz crystal granules has a higher viscosity than synthetic quartz glass and thus additionally brings about an improvement of the stability of shape of the tubular quartz glass body of the invention.

Good results have been obtained with tubular quartz glass bodies in accordance with the invention, in which the wall thickness of the portion consisting of fused quartz crystal powder or of fused quartz crystal granules amounts to at least 50% of the total wall thickness of the quartz glass body. The inner tubular portion of high-purity synthetic quartz glass must have a wall thickness of at least 0.05 mm.

It is, of course, also possible to weld tubular pieces to one or both ends of the tubular quartz glass bodies constructed in accordance with the invention, said tubular pieces consisting of fused quartz crystal powder alone or of fused quartz crystal granules alone, which if desired may be shape-stabilized in accordance with the prior art with nuclei or by means of a cristobalite layer. When such tubular quartz glass bodies are used in diffusion processes in semiconductor technology the attached tubular pieces are not exposed to the high temperatures.

Figure 1:
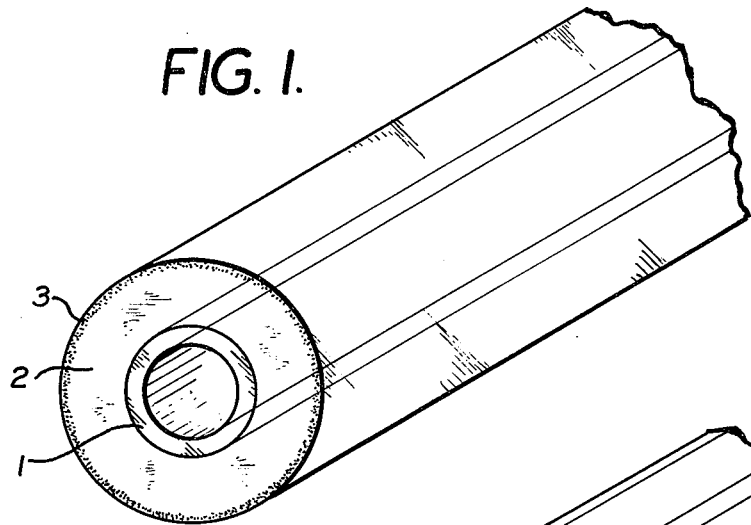
FIG. 1 is an end perspective view of a tubular quartz glass body of the invention.

Referring now to the drawing, in FIG. 1, the reference number 1 identifies an inner tubular portion consisting of high-purity synthetic quartz glass. This tubular portion 1 is surrounded by a portion 2 which is fused to portion 1. Portion 2 consists of fused quartz crystal granules or fused quartz crystal powder. The outer surface layer portion 2 additionally contains incorporated nuclei 3 which promote crystallization and consists of substances which are not semiconductor poisons and/or whose rate of diffusion into $SiO_2$ at temperatures ranging between 1,200° and 1,380°C is low in comparison to that of sodium.

Figure 2:
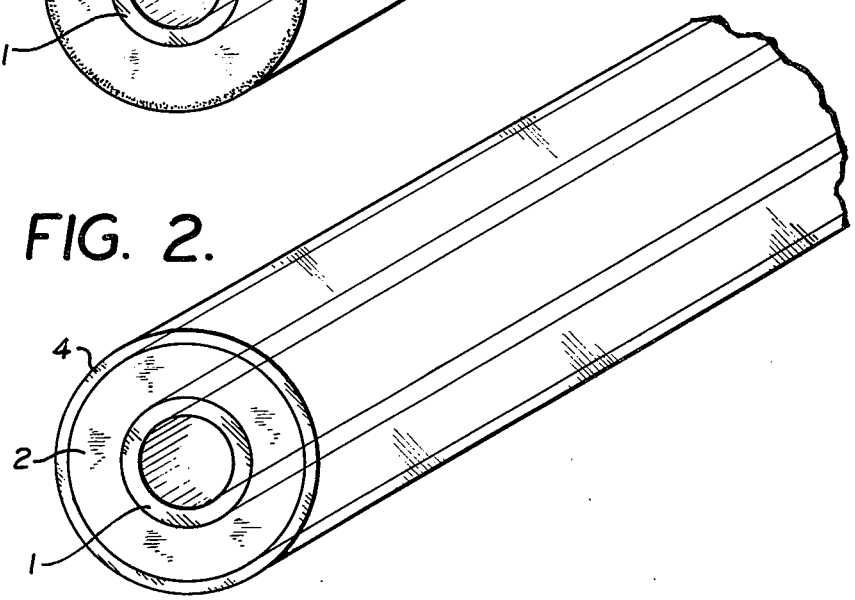
FIG. 2 is an end perspective view of another tubular quartz glass body according to the invention.

The tubular quartz glass body represented in FIG. 2 differs essentially from the one represented in FIG. 1 in that portion 2 has a coherent, finely crystalline cristobalite coating 4 as the outer surface layer instead of the nuclei 3 of FIG. 1.

Figure 3:
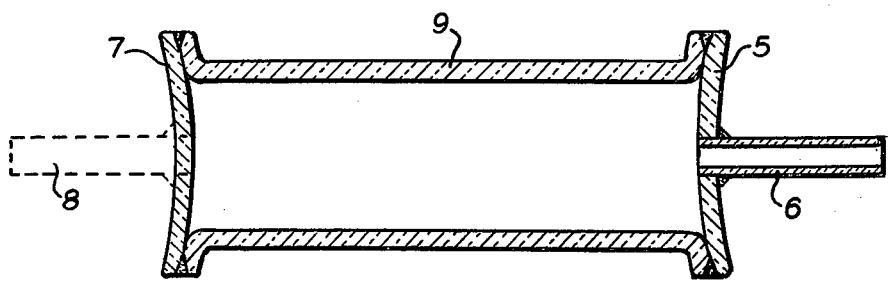
FIG. 3 is a vertical cross-sectional view taken through a tubular quartz body of the invention which has been made into an ampoule.

The quartz glass ampoule represented in FIG. 3 consists of a tubular portion 9 which is constructed either in accordance with FIG. 1 or in accordance with FIG. 2. The one end of the tubular portion 9 is hermetically sealed with a lid 5 of quartz glass which has a tubular projection 6 which serves, for example, for the evacuation of the ampoule and through which doping substances may be introduced if desired for the doping of semiconductor wafers.

The other end of the tubular portion 9 is hermetically sealed with the bottom 7 of quartz glass which, if desired, may also have a tubular projection 8, represented by broken lines in the drawing. Especially good results have been obtained with a tubular projection sealed from the outside in which doping substances for semiconductor components are located if desired. In this case the tubular projection 6 is used only as a pumping connection.

What is claimed is:

1. Diffusion tube comprising an inner tubular portion of high-purity synthetic quartz glass fused to a surrounding portion of quartz glass, said inner portion having a wall thickness of at least 0.05 mm, said surrounding portion consisting of a quartz glass manufactured by fusion of quartz crystals in granular or powder form and having an outer layer of finely crystalline cristobalite or in the outer surface layer thereof crystallization promoting nuclei capable of forming an outer layer of crystalline silica, said nuclei having a rate of diffusion in quartz glass less than that of sodium at elevated temperatures, and said surrounding portion having a wall thickness amounting to at least 50% of the total wall thickness of the diffusion tube.

2. Diffusion tube of claim 1 wherein one end is hermetically sealed with a lid of quartz glass having a tubular projection and the other end is hermetically sealed with a bottom of quartz glass.

3. Diffusion tube of claim 2 wherein said bottom has a tubular projection.

* * * * *